United States Patent
Jeltsch

[11] Patent Number: 6,044,564
[45] Date of Patent: Apr. 4, 2000

[54] BRANCH CUTTER TOOL

[75] Inventor: Thomas Jeltsch, Markdorf, Germany

[73] Assignee: J. Wagner GmbH, Friedrichshafen, Germany

[21] Appl. No.: 08/834,485

[22] Filed: Apr. 14, 1997

[30] Foreign Application Priority Data

Apr. 27, 1996 [DE] Germany .................... 196 16 948

[51] Int. Cl.[7] .......................... A01G 3/037; B26B 13/00
[52] U.S. Cl. ........................... 30/228; 30/247; 30/249; 30/251
[58] Field of Search .................. 30/228, 247, 249, 30/245, 246, 250, 251

[56] References Cited

U.S. PATENT DOCUMENTS

| 1,642,259 | 9/1927 | Morse . |
| 1,662,473 | 3/1928 | Ralston . |
| 1,786,625 | 12/1930 | Lindstrom . |
| 2,075,341 | 3/1937 | Goodman ................................. 20/11 |
| 2,286,552 | 6/1942 | Klose ...................................... 30/228 |
| 2,490,086 | 12/1949 | Page ..................................... 30/228 X |
| 2,705,858 | 4/1955 | Marsh ...................................... 56/25 |
| 3,178,816 | 4/1965 | Schmid .................................... 30/228 |
| 3,199,193 | 8/1965 | Norty ....................................... 30/228 |
| 3,408,875 | 11/1968 | Briskman ................................... 74/48 |
| 3,536,976 | 10/1970 | Briskman ................................. 318/443 |
| 3,583,067 | 6/1971 | Briskman ................................. 30/228 |
| 3,631,596 | 1/1972 | Glaus ....................................... 30/228 |
| 3,693,254 | 9/1972 | Salonen .................................... 30/228 |
| 4,359,821 | 11/1982 | Pellenc ................................ 30/249 X |
| 4,682,416 | 7/1987 | Stolfa ...................................... 30/228 |
| 4,967,474 | 11/1990 | Wells ....................................... 30/228 |
| 5,341,572 | 8/1994 | Michelson ................................. 30/228 |

FOREIGN PATENT DOCUMENTS

| 0 118 350 | 9/1984 | European Pat. Off. ........ B26B 15/00 |
| 0 291 431 | 11/1988 | European Pat. Off. ......... A01G 3/03 |
| 2 635 435 | 2/1990 | France .............................. A01G 3/02 |
| 94 01 672 | 5/1994 | Germany ......................... A01G 3/03 |
| 1192718 | 11/1985 | U.S.S.R. .................................. 30/228 |
| 903882 | 8/1962 | United Kingdom ..................... 30/247 |

*Primary Examiner*—M. Rachuba
*Assistant Examiner*—Charles Goodman
*Attorney, Agent, or Firm*—Faegre & Benson LLP

[57] ABSTRACT

A branch cutter tool (1) having two blades (11,12) that are movable in relation to each other, of which one blade (11) is rigidly connected with a housing (2) and the other blade (12) can be moved by an electric motor (5) via a threaded spindle (8), a threaded nut (21) arranged on the threaded spindle and a rod assembly connected to the threaded nut. The blade (11) has an extension (13) projecting into the housing (2) and the threaded spindle (8) is rotatably supported by means of a rolling bearing (31) which is fixed to the threaded spindle (8) and is axially supported in a recess (17) formed into the extension (13) such that the cutting forces taking place in a cutting operation are absorbed by the components involved so that the housing (2) is not subjected to stress by these forces. The tensile forces transferred to the threaded spindle (8) when the movable blade (12) is closed are applied to the extension (13) via the rolling bearing (31). Furthermore, a force acts upon the extension in the opposite direction in the region of the bearing support of the movable blade (12) so that these forces thus cancel each other out and a closed power flux results.

9 Claims, 2 Drawing Sheets

BRANCH CUTTER TOOL

BACKGROUND OF THE INVENTION

The invention relates to a branch cutter tool or the like, in particular having two blades that are movable in relation to each other, of which one blade is rigidly connected with a housing and the other blade can be moved by an electric motor arranged in the housing via a threaded spindle capable of being rotated by said electric motor, a threaded nut located on the threaded spindle and supported so as to be non-rotating and a rod assembly connected to the threaded nut.

EP 0 291 431-A1 discloses branch shears of this class. In this tool, the fixed blade is screwed to the housing which is provided with a lug formed on it and projecting to the outside for this purpose. In addition, the threaded spindle driven by the motor is directly braced against an intermediate wall of the housing by means of two needle bearings so that both the forces to be absorbed by the fixed blade as well as the forces exerted on the pivotable blade occurring during a cutting operation must be absorbed by the housing.

Aside from the fact that the housing must thus be sized to be sufficiently large, it must also be produced from a high-quality material of high strength in order to avoid damages, fractures in particular, caused by excessive loads resulting from high cutting forces. Consequently, the known branch shears have a high inherent weight and are difficult to handle. The investment expenditure is also considerable.

OBJECT OF THE INVENTION

The object of the invention is therefore to devise a branch cutter tool of the above-cited class in particular, that is of simple structural design and consequently economical to manufacture; however, the primary objective is to bring it about that the housing need only absorb very slight forces in a cutting operation so that it can be designed for easy and handy use. The constructional expense to achieve this should kept low; nevertheless, satisfactory function with high operating safety and easy handling should be assured.

SUMMARY OF THE INVENTION

In accordance with the invention, this is attained in a branch cutter tool of the above-cited class in particular, in which the blade connected with the housing has an extension projecting into the housing in the direction of the threaded spindle and the end region of the threaded spindle facing away from the drive motor is rotatably supported in a rolling bearing which is fixedly arranged on the threaded spindle in its axial direction and is axially supported, preferably on both sides, in a recess formed into the extension.

In this case, it is expedient to guide the threaded nut movably in an axial direction by means of two or more centrally located non-rotating lugs or the like projecting toward the outside into grooves provided in the housing. Furthermore, it is appropriate to design the rod assembly connecting the threaded spindle with the movable blade in the form of two levers that are guided laterally past the rolling bearing and the extension of the fixed blade and are coupled to the threaded nut and the movable blade, and wherein the outer surface of the threaded nut is provided with one or several preferably rounded projections which engage recesses in the lever, preferably forming brackets, for the coupling of the levers to the threaded nut.

If a branch cutter tool is designed in accordance with the present invention, the simple structural design thereof arranges for the forces resulting from a cutting operation to be absorbed by the components involved so that the housing is not subjected to stress by these forces and can thus be designed in a correspondingly simple and ergonomic form. The tensile forces transferred to the threaded spindle when the movable blade is closed by the threaded nut are applied to the extension via a rolling bearing. A force acts upon the extension in the region of the bearing support of the movable blade in the same manner but in the opposite direction. These forces thus cancel each other out in the components directly involved in a cutting operation so that a closed power flux results and the housing is nearly free of forces. This guarantees reliable function over a long period of time, especially since the handling of the tool designed in accordance with the proposed invention is simple.

BRIEF DESCRIPTION OF THE DRAWINGS

An exemplary embodiment of the branch shears in accordance with the invention will now be described in greater detail below with reference to the accompanying drawings.

DETAILED DESCRIPTION

Figure 1:
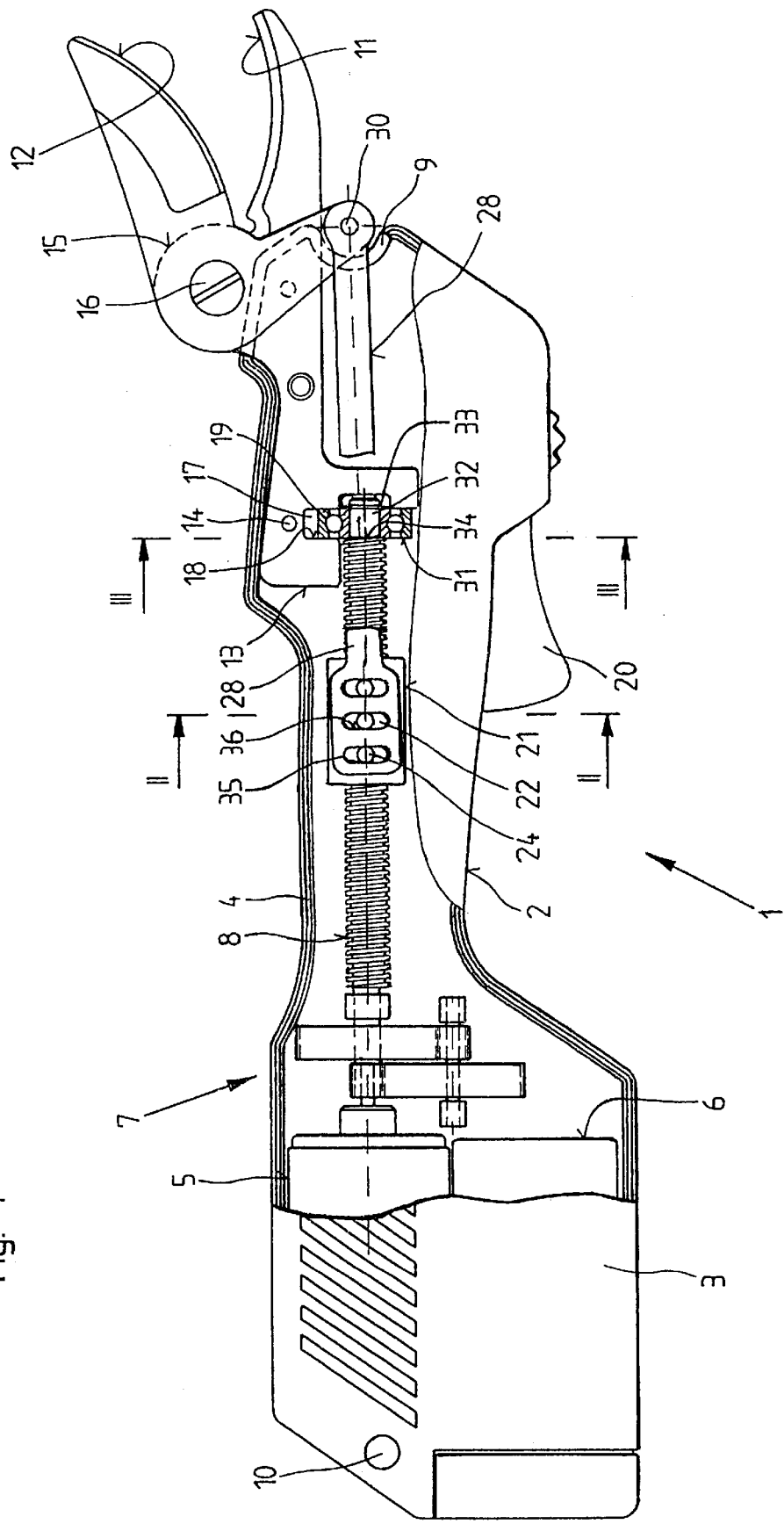
FIG. 1 shows the branch shears, partially in axial section and partially in plan view.

The branch cutter tool shown in FIG. 1 and identified as 1 is essentially comprised of two blades 11 and 12 which are movable in relation to each other and project out of a double shelled housing 2; of said blades, blade 11 is rigidly connected to the housing 2 and blade 12 is pivotable by means of an electric motor 5. For this purpose, the electric motor 5, which is powered by a battery 6, has a drive connection with blade 12 via a reduction gear 7, a threaded spindle 8 as well as a spindle nut 21 which can be displaced by said threaded spindle and a rod assembly 28, 29 comprised of levers 28 and 29.

Housing 2 is comprised of two plastic shells 3 and 4 which are provided with an opening 9 on the end opposite the electric motor 5, through which the blades 11 and 12 protrude. The half-shells 3 and 4 are fixedly connected by means of screws 10.

In order to be able to absorb the forces occurring during a cutting operation within the components involved so that these forces are not transferred to housing 2, blade 11 is provided with an extension 13 projecting in the direction of threaded spindle 8, said extension being fixed to half shell 4 by means of screws penetrating through drilled holes 14. In addition, extension 13 has a bearing axle 15 in which blade 12 is held pivotably by means of a bolt 16. Furthermore, a recess 17 is formed into extension 13 in the area of threaded spindle 8 and a rolling bearing 31 is disposed on threaded spindle 8 and axially supported in recess 17 so that the rolling bearing cannot be moved in an axial direction. In addition, threaded spindle 8 is provided with a stepped pin 32 on which the rolling bearing 31 is placed. Rolling bearing 31 is fixed to threaded spindle 8 by means of a snap ring 33 held in pin 32 on the one hand and by a stopping face 34 formed onto threaded spindle 8; in addition, the opposite facing surfaces of recess 17 are formed as bearing surfaces 18 and 19 for rolling bearing 31. Forces acting upon threaded spindle 8 can thus be transferred to extension 13 via rolling bearing 31.

Figure 2:
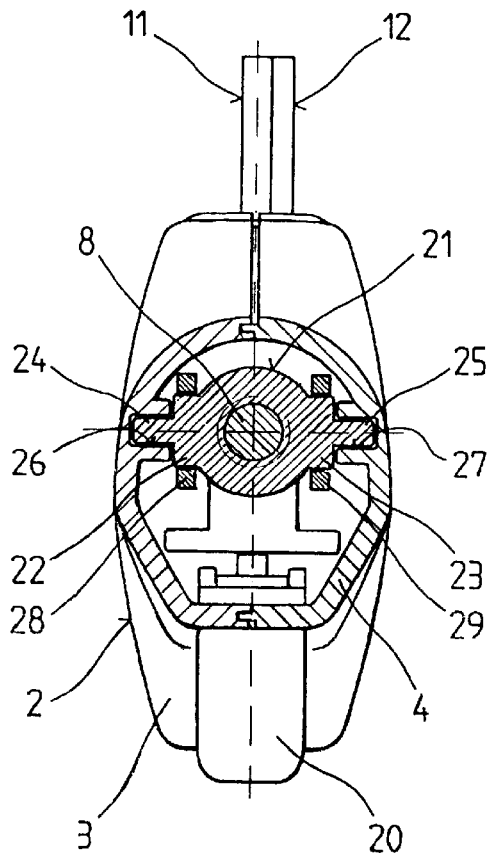
FIG. 2 shows a section according to Line II—II of FIG. 1.
Figure 3:
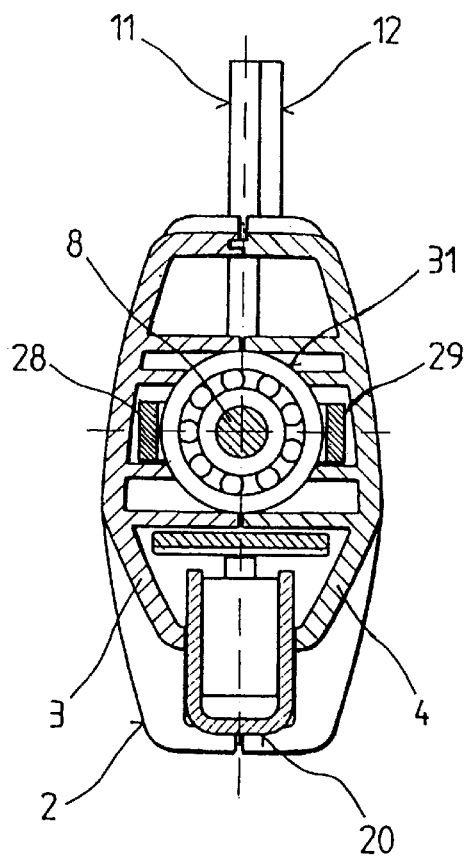
FIG. 3 shows a section according to Line III—III of FIG. 1.

As can especially be seen in FIG. 2, threaded nut 21 can be guided non-rotatingly but moved in an axial direction by means of two lugs 24 and 25 projecting laterally into grooves 26 and 27 formed into half-shells 3 and 4 of housing 2. In the exemplary embodiment shown, lugs 24 and 25 project past projections 22 and 23, respectively, to which levers 28 and 29 are coupled at one end, said levers being formed for this purpose as brackets 35 with recesses 36 to contain projections 22 and 23. At the other end, levers 28 and 29 have a drive connection with movable blade 12 by means of a joint pin 30.

If electric motor 5 is switched on by means of an actuating lever 20 and threaded spindle 8 is rotated by the motor such that threaded nut 21 is moved to the left, blade 12 is then pivoted on bolt 16 via levers 28 and 29 which have a drive connection with the threaded nut so that a branch found between blades 11 and 12 is sheared off. A reversal of the direction of rotation of electric motor 5 again returns blades 11 and 12 into the operating position shown.

If a part is severed with branch shears 1, then the threaded nut 21 must be displaced to the left by threaded spindle 8 driven by electric motor 5 in order to move blade 12 in the direction of the fixed blade 11. The tensile force occurring as a result is absorbed by bearing surface 19 via rolling bearing 31. However, at the same time, an opposite force initiated by the pivoting of blade 12 and transferred to extension 13 via bolt 16 acts upon extension 13. And since these forces are of nearly equal magnitude but are directed toward each other from opposite directions, the result is a closed power flux so that housing 2 is nearly free of strains caused by a cutting operation.

What is claimed is:

1. A branch cutter tool (1) having:
   a first blade (11) and a second blade (12) that are movable in relation to each other;
   a housing (2) having an axial direction and wherein the first blade (11) is rigidly connected to the housing (2);
   an electric motor (5) having a circuit and located in the housing;
   a threaded spindle having an end region which faces away from the electric motor and which is rotatable by the electric motor for moving the second blade,
   a threaded nut (21) arranged on the threaded spindle and supported so as to be non-rotating; and
   a rod assembly connected to the threaded nut (21); wherein
   a rolling bearing (31) is fixedly arranged on the threaded spindle (8) in the axial direction of the housing;
   the first blade connected with the housing (2) includes an extension (13) having a recess (17) formed therein which projects into the housing (2) along a direction of the threaded spindle (8); and
   the end region of the threaded spindle (8) facing away from the electric motor (5) is rotatably supported in the rolling bearing (31) and is supported in the recess (17) formed into the extension (13).

2. The tool of claim 1, further including a plurality of non-rotating lugs (24,25), and grooves (26,27) provided in the housing (2) wherein the threaded nut (21) is guided movably in the axial direction of the housing by the plurality of non-rotating lugs (24,25) which project into the grooves (26,27) provided in the housing (2).

3. The tool of claim 2, wherein the rod assembly connecting the threaded spindle (8) with the second blade (12) is formed by two levers (28,29) that are guided laterally past the rolling bearing (31) and the extension (13) of the first blade (11), and are coupled to the threaded nut (21) and the second blade (12).

4. The tool of claim 3, wherein each of the two levers (28,29) includes a recess (36) and an outer surface of the threaded nut (21) is provided with at least one pair of projections (22,23) each of which engage one of the recesses (36) formed in the levers (28,29) in order to couple the levers (28,29) to the threaded nut (21).

5. The tool of claim 5, wherein the projections (22,23) are rounded.

6. The tool of claim 1, wherein the rod assembly connecting the threaded spindle (8) with the second blade (12) is formed by two levers (28,29) that are guided laterally past the rolling bearing (31) and the extension (13) of the first blade (11), and are coupled to the threaded nut (21) and the second blade (12).

7. The tool of claim 4, wherein each of the two levers (28,29) includes a recess (36) and an outer surface of the threaded nut (21) is provided with at least one pair of projections (22, 23) each of which engage one of the recesses (36) formed in the levers (28,29) in order to couple the levers (28,29) to the threaded nut (21).

8. The tool of claim 7 wherein the projections (22,23) are rounded.

9. The tool of claim 7 wherein the levers (28,29) have enlarged portions forming brackets (35) surrounding the recesses (36).

* * * * *